(12) United States Patent
Hendrix

(10) Patent No.: US 6,682,412 B2
(45) Date of Patent: Jan. 27, 2004

(54) APPARATUS FOR HOLDING, SUPPORTING AND MANEUVERING AN ANIMAL CARCASS WHILE HOLDING OPEN THE RIB CAGE OF THE CARCASS

(76) Inventor: Gary S. Hendrix, 2202 Oak St., Abilene, TX (US) 79602

( * ) Notice: Subject to any disclaimer, the term of this patent is extended or adjusted under 35 U.S.C. 154(b) by 0 days.

(21) Appl. No.: 10/068,908

(22) Filed: Feb. 8, 2002

(65) Prior Publication Data
US 2003/0153258 A1 Aug. 14, 2003

(51) Int. Cl.[7] .................................................. A22B 3/10
(52) U.S. Cl. ........................................................ 452/187
(58) Field of Search ................................ 452/185, 187, 452/192, 197, 163, 167, 79, 82, 86, 190, 128

(56) References Cited

U.S. PATENT DOCUMENTS

| | | | |
|---|---|---|---|
| 1,603,562 A | * 10/1926 | Taylor ....................... 452/197 |
| 3,711,895 A | 1/1973 | Arendale |
| 4,283,854 A | 8/1981 | Austin |
| 4,317,257 A | 3/1982 | Engel |
| 4,716,626 A | 1/1988 | Chiron et al. |
| 4,901,397 A | 2/1990 | Pursell et al. |
| 5,129,856 A | * 7/1992 | Hahn et al. ................ 452/128 |
| 5,236,386 A | 8/1993 | Dingee |
| 5,338,250 A | 8/1994 | Swilley et al. |
| 5,360,368 A | 11/1994 | Hajek |
| 5,453,043 A | 9/1995 | Monson |
| 5,562,534 A | 10/1996 | McGough |
| 5,591,077 A | 1/1997 | Rowe |
| 5,597,351 A | 1/1997 | Queally et al. |
| 5,707,281 A | 1/1998 | Hicks |
| 5,713,787 A | 2/1998 | Schoenmakers et al. |
| 5,873,776 A | * 2/1999 | Klepac ....................... 452/191 |
| RE36,645 E | * 4/2000 | Davis ......................... 452/128 |
| 6,059,649 A | 5/2000 | Ballard |
| 6,231,436 B1 | * 5/2001 | Bakker ....................... 452/188 |
| 6,244,951 B1 | * 6/2001 | Leining ...................... 452/185 |

* cited by examiner

Primary Examiner—Thomas Price
(74) Attorney, Agent, or Firm—Dennis T. Griggs

(57) ABSTRACT

An apparatus for spreading open a rib cage of an animal carcass, and for holding, supporting, and maneuvering the carcass while holding open the rib cage of the carcass, is provided. A first support member is coupled to a first actuator for up and down movement along a first axis. A second support member is pivotally coupled to the first support member so that the second support member can be pivoted about a second axis by a second actuator. A third actuator is attached to and supported by the second support member. A scissors linkage is coupled to the third actuator at a first end of the scissors linkage, coupled to the second support member at central portion of the scissors linkage, and coupled to the spreading plates at a second end of the scissors linkage. The actuators may be pneumatically, hydraulically and/or electrically driven, for example.

26 Claims, 4 Drawing Sheets

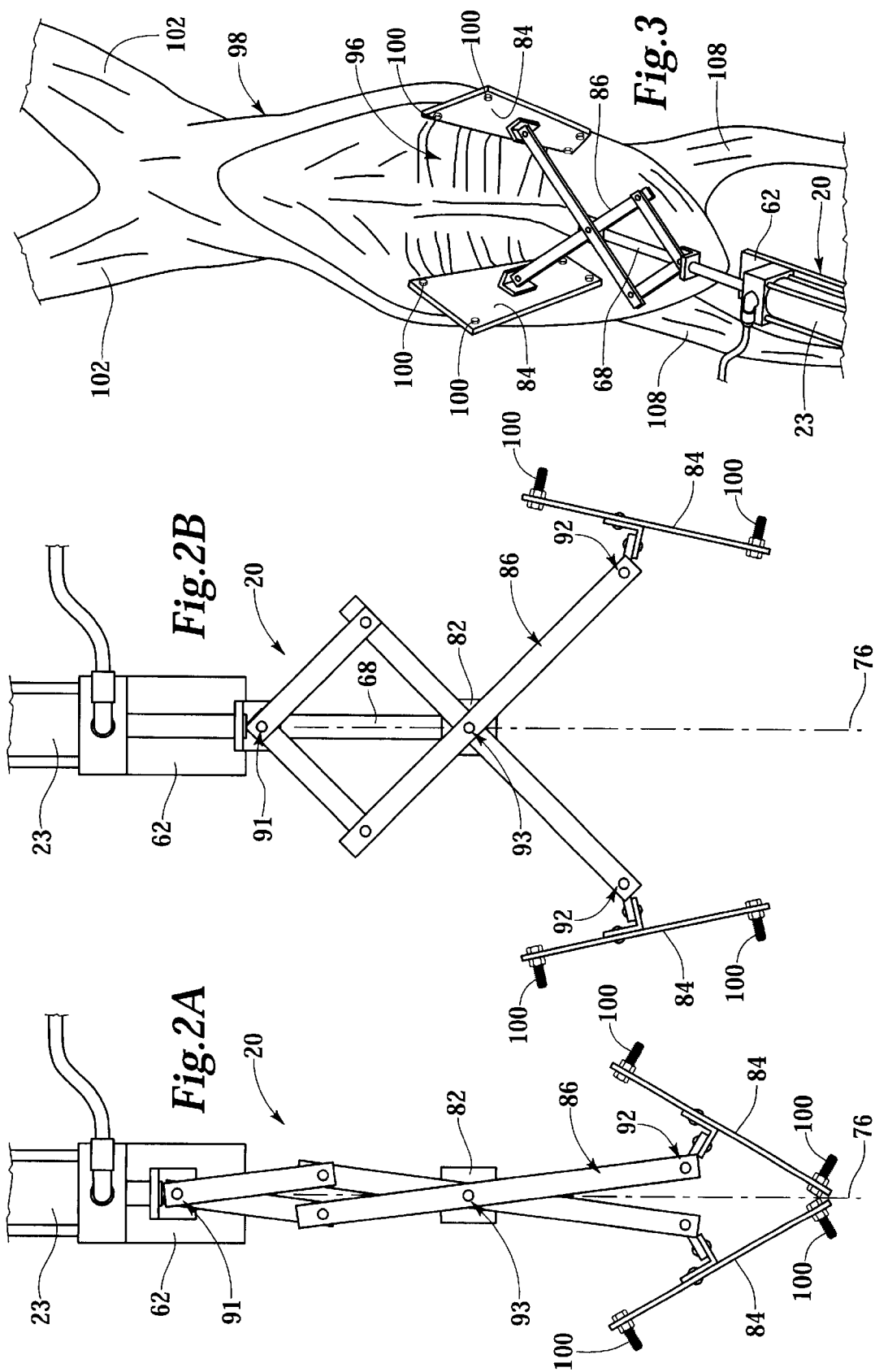

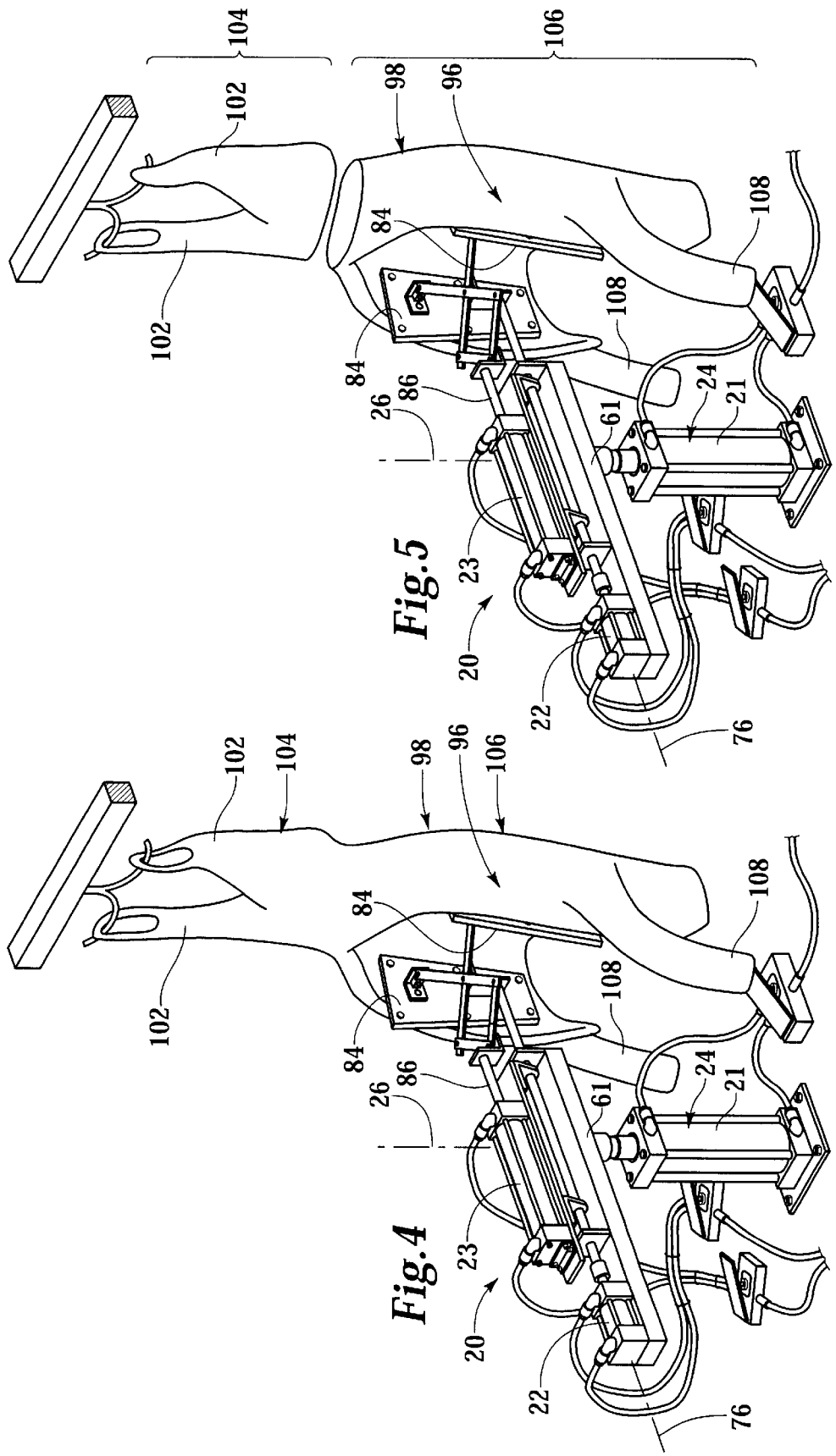

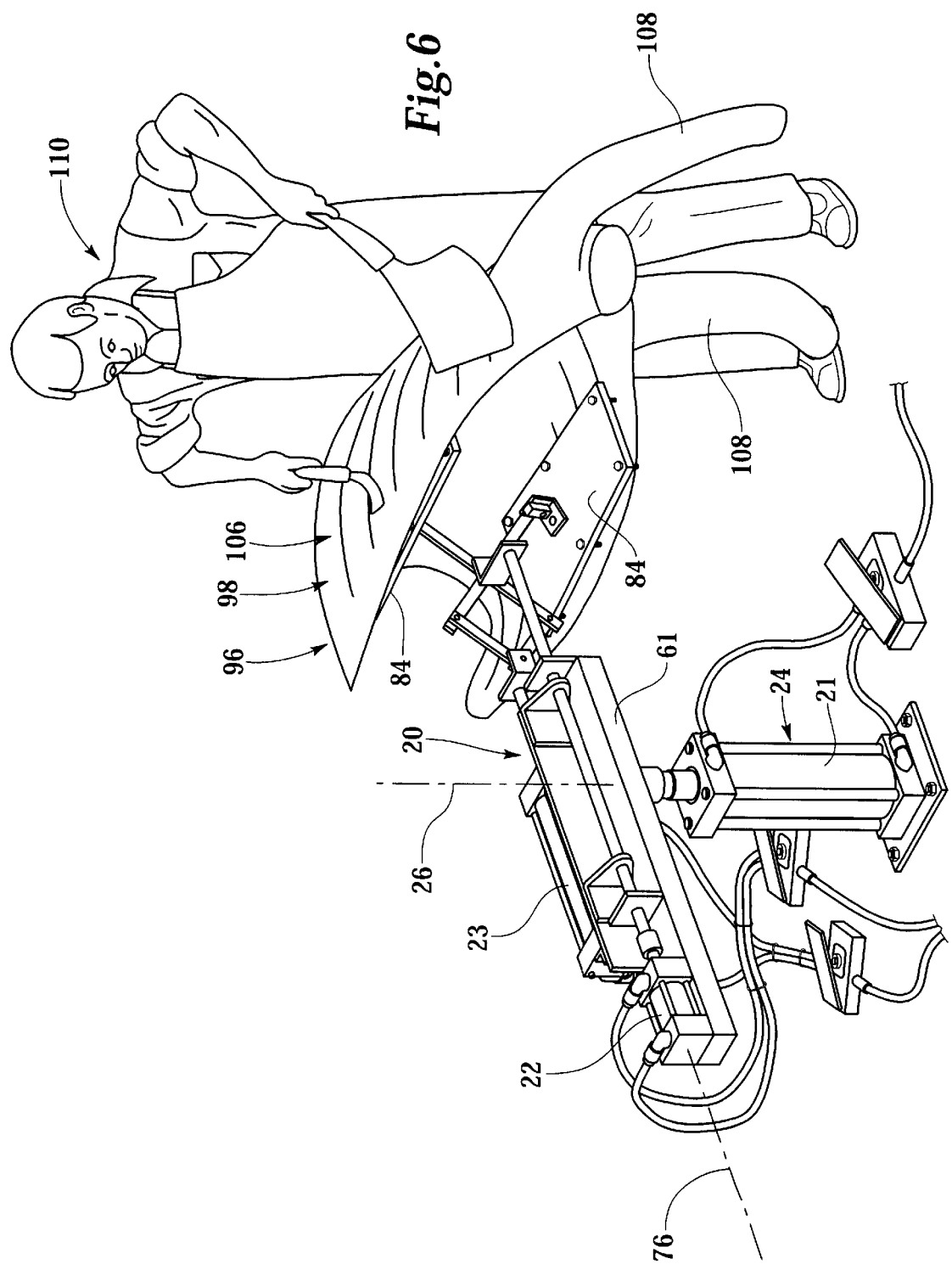

APPARATUS FOR HOLDING, SUPPORTING AND MANEUVERING AN ANIMAL CARCASS WHILE HOLDING OPEN THE RIB CAGE OF THE CARCASS

BACKGROUND OF THE INVENTION

This invention relates generally to an apparatus for holding an animal carcass while spreading open the rib cage of the carcass while it is being dressed.

When an animal carcass is being prepared for carving, the internal organs are typically removed immediately before the carcass cools and while the carcass is still flexible (i.e., before rigor mortis sets in). Typically the carcass is hung vertically by two limbs and the ribs are spread open before removing the internal organs to make it easier and safer to handle the carcass. Spreading open the rib cage eliminates the need for blindly reaching into the carcass to remove the internal organs, which also reduces the amount of blood that gets on the dresser's arms and clothing, and it reduces the risk of contracting a disease from the animal's blood (e.g., Lyme disease).

A freshly slain animal carcass is relatively elastic and the rib cage has a natural tendency to return to a closed position after being pried open. Also, when rigor mortis sets in, the carcass becomes more stiff and difficult to move from its current configuration. Hence, the carcass is often dressed immediately after the animal is slain. There are many existing devices for hanging an animal carcass and for spreading open the rib cage of the carcass.

For example, U.S. Pat. Nos. 4,901,397; 5,707,281; 5,360,368 and 6,059,649 each disclose a hand-operated mechanical apparatus for manually spreading open and holding open a rib cage of an animal carcass. However, these devices do not support the weight of the carcass and allow the carcass to be easily rotated or moved up/down into a better position for carving meat from the carcass. Also, some apparatuses in these patents provide some mechanical assistance for spreading open the rib cage, but each still requires substantial hand or arm strength and dexterity to actuate the apparatus. If rigor mortis has already set in or if the carcass is nearly frozen, such apparatus may be difficult to operate because of limited mechanical assistance. Furthermore, when carving meat from a carcass on a table, it is difficult to hold the carcass still while carving and it is difficult to make efficient cuts. Still further, handling a carcass that is large (e.g., an elk or bear) may require a lot of heavy lifting. Hence, there is a need for an apparatus that provides more assistance in handling the carcass and spreading open the rib cage.

There are also several patents disclosing various devices for hanging and supporting the weight of the carcass, such as U.S. Pat. Nos. 4,317,257; 5,236,386; 5,562,534 and 5,591,077. However, the devices disclosed in these patents do not provide a way to easily maneuver and/or rotate the carcass while carving the meat therefrom. When carving meat from a carcass while it is hanging by its limbs, the carcass often has a tendency to swing and/or turn and rotate, which makes it difficult to work with. Also, having to bend, stoop and travel up and down the carcass with a knife while carving meat puts strain on a person's back and requires a lot of physical effort.

Accordingly, there is a need for an apparatus that will support the carcass and rotate or maneuver the carcass to a different position more conducive to carving meat from the carcass. There is also a need for an apparatus that holds the carcass in a stable position and that will make the carcass easier to handle while removing meat from various portions of the carcass.

BRIEF SUMMARY OF THE INVENTION

The problems and needs outlined above are addressed by the present invention. In accordance with one aspect of the present invention, an apparatus for holding and maneuvering an animal carcass while holding open a rib cage of the carcass, is provided. The apparatus preferably included a first support member, a second support member, a linear actuator, a pair of spreading plates, and a scissors linkage. The second support member is pivotally coupled to the first support member so that the second support member can pivot about an axis relative to the first support member. The linear actuator is attached to and supported by the second support member. The scissors linkage is coupled to the actuator at a first end of the linkage, coupled to the second support member at a central portion of the linkage, and coupled to the spreading plates at a second end of the linkage.

The apparatus may further comprise a base member, wherein the first support member is coupled to and supported by the base member. The base member may comprise a base actuator, so that the base actuator can move the first support member relative to the base member. The base actuator preferably includes a pneumatic cylinder; a hydraulic cylinder; an electric motor and a screw gear, where the electric motor is adapted to drive the screw gear; an electric solenoid; or any combination thereof, for example. Similarly, the linear actuator may include a pneumatic cylinder; a hydraulic cylinder; an electric motor and a screw gear, where the electric motor is adapted to drive the screw gear; an electric solenoid; or any combination thereof, for example.

The apparatus may further comprise a pivotal actuator coupled to the first support member and pivotally coupled to the second support member so that the pivotal actuator can pivot the second support member relative to the first support member. The pivotal actuator preferably includes a pneumatic motor; a hydraulic motor; an electric motor; or any combination thereof, for example.

In accordance with another aspect of the present invention, an apparatus for spreading open a rib cage of an animal carcass, and for holding, supporting and maneuvering the carcass while holding open the rib cage of the carcass is provided. The apparatus includes a first actuator; a first support member; a second support member; a second actuator; a third actuator; a pair of spreading plates; and a scissors linkage. The first support member is coupled to the first actuator so that the first actuator can move the first support member up and down along a first axis. The second support member is pivotally coupled to the first support member so that the second support member can pivot about a second axis relative to the first support member. The second actuator is coupled to the second support member so that the second actuator can pivot the second support member about the second axis. The third actuator is attached to and supported by the second support member.

The scissors linkage is coupled to the third actuator at a first end of the scissored linkage, coupled to the second support member at central portion of the scissored linkage, and coupled to the spreading plates at a second end of the scissored linkage. The first, second, and third actuators may be pneumatic actuators or hydraulic actuators, for example. In such cases, the apparatus may further comprise three foot pedal valve switches.

The first foot pedal valve switch for controlling movement of the first actuator may be fluidly coupled to the first actuator by a first pair of hoses. The second foot pedal valve switch for controlling movement of the second actuator may be fluidly coupled to the second actuator by a second pair of hoses. The third foot pedal valve switch for controlling movement of the third actuator may be fluidly coupled to the third actuator by a third pair of hoses. In an alternative embodiment, the first, second and third actuators may each comprise an electric motor and/or an electric solenoid. In such case, the actuators may have foot pedal electrical switches for controlling the electric motor(s) and/or an electric solenoid(s). The spreading plates may have screw members extending therefrom to help grip and hold the carcass in place more firmly.

BRIEF DESCRIPTION OF THE DRAWINGS

The accompanying drawings are incorporated into and form a part of this specification to illustrate a preferred embodiment of the present invention. Various advantages and features of the invention will be understood from the following detailed description taken with reference to the attached drawing figures in which:

FIG. 2A shows a partial top view of the preferred embodiment of FIG. 1 with the scissors linkage extended and the spreading plates together;

FIG. 2B shows a partial top view of the preferred embodiment of FIG. 1 with the scissors linkage retracted and the spreading plates apart;

FIG. 3 shows a front view of an animal carcass with the preferred embodiment of FIG. 1 installed therein;

FIG. 4 shows a perspective view of the preferred embodiment of FIG. 1 being used on the animal carcass of FIG. 3;

FIG. 5 shows a perspective view of the animal carcass in FIGS. 3 and 4 with the preferred embodiment of FIG. 1 installed therein; and FIG. 6 shows a perspective view a person carving meat from the carcass of FIGS. 3–5 with the animal carcass and the second support member tilted to one side.

DETAILED DESCRIPTION OF THE INVENTION

Figure 1:
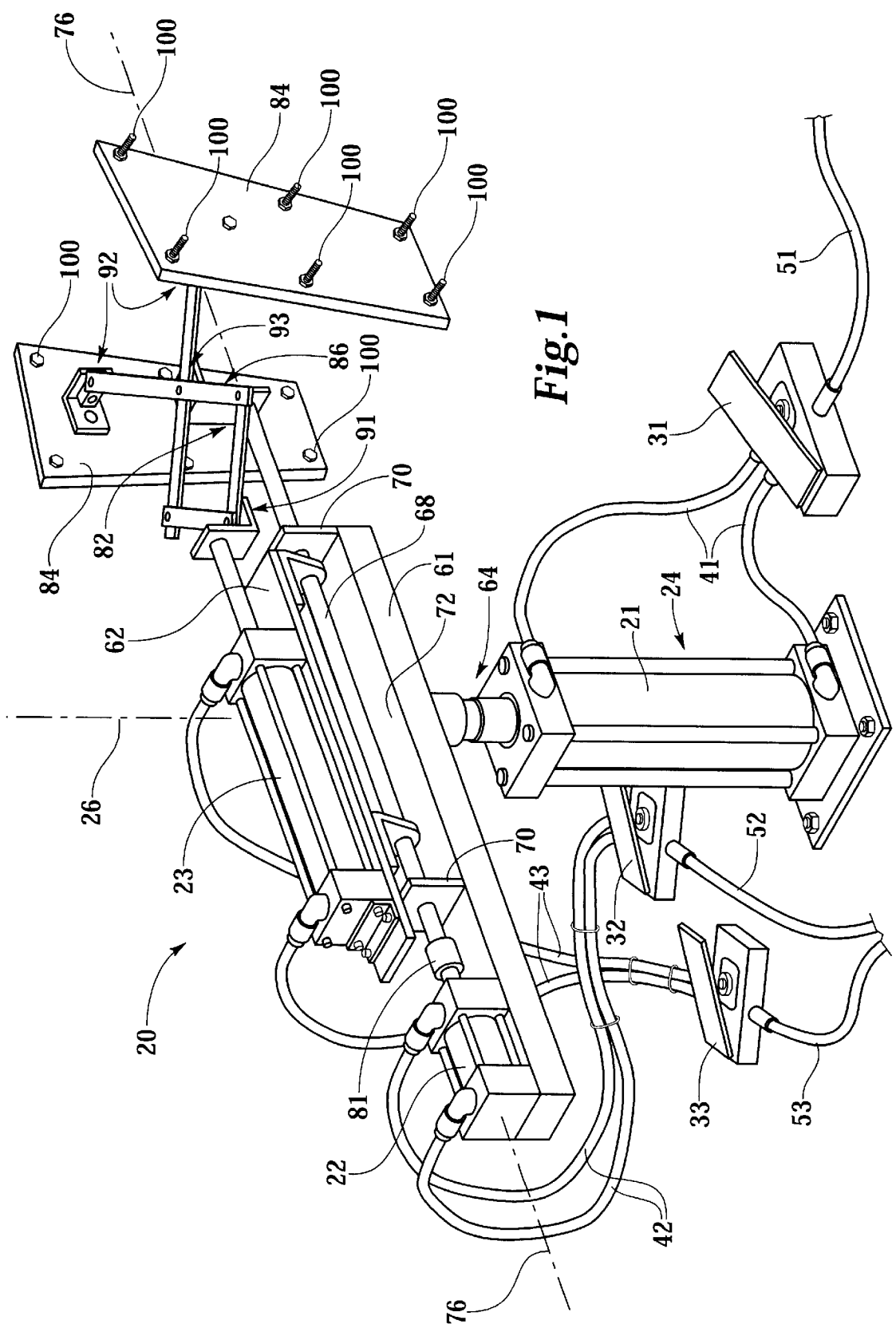
FIG. 1 shows a perspective view of a preferred embodiment of the present invention.

A preferred embodiment of the invention will now be described with reference to various examples of how the invention can best be made and used. Like reference numerals are used throughout the description and several views of the preferred embodiment to indicate like or corresponding parts.

FIGS. 1–6 illustrate a preferred embodiment of the present invention. The preferred embodiment is an apparatus 20 for spreading open a rib cage of an animal carcass, and for holding, supporting, and maneuvering the carcass while holding open the rib cage of the carcass.

FIG. 1 is a perspective view of the preferred embodiment, which shows the details and interconnections among the various parts of the apparatus 20. In the preferred embodiment, three pneumatic actuators 21, 22, 23 driven by pressurized air are used. However, any of the pneumatic actuators 21–23 in the preferred embodiment may be substituted with a hydraulic actuator or an electric actuator (not shown), for example, to form an equivalent apparatus (not shown). As shown in FIG. 1, the first actuator 21 acts as a base member 24. In other embodiments (not shown), the base member 24 may comprise other parts, such as a block of concrete, a table, a slab of metal, a decorative cover, or any combination thereof, for example.

In the preferred embodiment, the base member 24 is adapted to be fastened to something solid that can at least support the weight of the apparatus 20, as well as the moments caused by the weight a carcass held by the apparatus and cutting forces exerted on the carcass while carving meat from the carcass. For example, the base member 24 may be bolted to the floor, bolted to the bed of a pickup truck, or bolted to a trailer bed. In alternative, the apparatus 20 may be free standing, such as when the base member 24 comprises a large block of concrete (not shown) having enough weight to anchor the apparatus 20 and keep it stable during use.

The first actuator 21 is a two-way pneumatic cylinder capable of extending up and retracting down along a first axis 26. A first foot-pedal-operated two-way pneumatic valve switch 31 is used to control the first actuator 21. A first pair of air hoses 41 connect among the first two-way valve switch 31 and the first actuator 21. Also, a first air source hose 51 connects from the first two-way valve switch 31 to a source of compressed air (not shown), such as an air compressor unit. Other types of valve switches may be used in alternative, such as a hand-operated valve switch (not shown) or an electrically controlled valve switch (not shown). An advantage of having a foot operated valve switch is that a user can control or actuate the first actuator 21 with a foot while leaving his or her hands free to do other things, such as holding a knife and carving meat.

A first support member 61 is coupled to an upper end 64 of the first actuator 21. A second support member 62 is pivotally coupled to the first support member 61. The second support member 62 has an elongated bar 68 that extends along and above the first support member 61. The first support member 61 has two brackets 70 welded on its upper surface 72. These brackets 70 each have a bushing therein adapted to accept the elongated bar 68 of the second support member 62 there through. Hence, the second support member 62 can pivot about a second axis 76 that extends along the center of the elongated bar 68 within the bushings. The bushings may be substituted with bearings.

A second actuator 22 is attached to the first support member 61 and pivotally coupled to a first end 81 of the bar 68 of the second support member 62. The second actuator 22 is adapted to pivot the second support member 62, which will in turn pivot the carcass held by the apparatus 20. Like the first actuator 21, the second actuator 22 is pneumatically driven by a second pair of air hoses 42 stemming from a second foot-pedal-operated two-way valve switch 32. Hence, the second actuator 22 can pivot clockwise or counterclockwise, depending on the air input received from the second valve switch 32. The second valve switch 32 is driven by a second air source hose 52, which stems from the same air source (not shown) providing compressed air for the first valve switch 31.

Still referring to FIG. 1, the apparatus 20 of the preferred embodiment further comprises a pair of spreading plates 84, and a scissor linkage 86, and a third actuator 23. The third actuator 23 is attached to and moves with the second support member 62. A first end 91 of the scissors linkage 86 is coupled to the third actuator 23, the spreading plates 84 are coupled to a second end 92 of the scissors linkage 86, and a central portion 93 of the scissors linkage 86 is coupled to a second end 82 of the bar 68 of the second support member 62. The scissors linkage 86 and the spreading plates 84, as well as the third actuator 23, pivot about the second axis 76 when the second support member 62 is pivoted about the second axis 76.

Thus when the second actuator 22 pivots the second support member 62 clockwise by 90 degrees, for example, the third actuator 23, scissor linkage 86, and spreading plates 84 also pivot clockwise by 90 degrees relative to the first support member 61. The preferred embodiment provides the ability to pivot the carcass 90 degrees clockwise and counterclockwise about the second axis (180 degrees total), which provides for a wide variety of positions while carving meat from a carcass.

FIGS. 2A and 2B illustrate how the scissors linkage 86 translates linear movement of the third actuator 23 into a spreading movement of the spreading plates 84. In FIG. 2A, the third actuator 23 is retracted, the scissors linkage 86 is extended, and the spreading plates 84 are together. In FIG. 2B, the third actuator 23 is extended, the scissors linkage 86 is compressed, and hence, the spreading plates 84 are spread apart away from each other. Thus, as the third actuator 23 is extended, the spreading plates 84 are pressed outward away from each other.

Like the first and second actuators 21, 22, the third actuator 23 is pneumatically driven by a third pair of air hoses 43 (see FIG. 1) stemming from a third foot-pedal-operated two-way valve switch 33. The third actuator 23 comprises a two-way pneumatic cylinder. Hence, the third actuator 23 can be extended or retracted, depending on the air input received from the third valve switch 33. The third valve switch 33 is driven by a third air source hose 53, which also stems from the same air source (not shown) providing compressed air for the first and second valve switches 31, 32.

FIGS. 3–6 illustrate the use of the preferred embodiment for spreading open a rib cage 96 of an animal carcass 98, and holding the rib cage 96 open while supporting, holding, and maneuvering the carcass 98 as desired or as needed while dressing the carcass 98 and carving meat from the carcass 98. The present invention may be adapted to be used for a wide variety of game animal carcasses, including but not limited to: deer, elk, moose, antelope, bear, alligator, crocodile, fox and wild bore, as well as game fish such as marlin and sword fish for example. The present invention may also be used for dressing a wide variety of domestic animal carcasses, including but not limited to: beef, poultry, lamb, goat, rabbit and pork.

As shown in FIGS. 1, 2A, and 2B, the spreading plates 84 have metal pins or screw members 100 projecting therefrom, which aid in better gripping and holding the carcass 98. Preferably, the protruding shaft end portions of the metal pins or screw members 100 are sealed or enclosed in a plastic jacket or covering. The plastic covering protects the edge of the carving knife and keeps it from being dulled by contact against the metal shaft portions that may protrude through the animal rib cage.

FIG. 3 shows a front view of the animal carcass 98 with the preferred embodiment of FIG. 1 installed therein (only part of the apparatus 20 being shown).

FIG. 4 shows a perspective view of the animal carcass 98 with the preferred embodiment installed therein. Note in FIG. 4 that the carcass 98 is hung by its rear limbs 102 in a conventional manner. With the carcass 98 hung by its rear limbs in a conventional manner and with the spreading plates 84 in a closed position (i.e., together as shown in FIG. 2A), the spreading plates 84 are inserted into the front of the carcass 98 between the left and right sides of the rib cage 96.

Note that at this point the carcass 98 has already had a saw cut down the center of the chest to separate the left and right sides of the rib cage 96.

While positioning the spreading plates 84 within the carcass 98, it may be desirable or necessary to raise or lower the spreading plates 84 with the first actuator 21. Hence, when the first actuator 21 is extended upwards (see FIG. 1), the first support member 61 and everything attached thereto, including the second actuator 22, the second support member 62, the third actuator 23, the scissors linkage 86, and the spreading plates 84 moves upward also.

With the spreading plates 84 inserted, the third actuator 23 is extended to cause the spreading plates 84 to press outward away from each other, as shown in FIG. 2B. As the spreading plates 84 press outward, they spread open the rib cage 96 of the carcass 98, as shown in FIG. 3. Because the rib cage 96 has a tendency to spring back to a normal position (closed), if the spreading plates 84 are held in this spread open position, as shown in FIG. 3, the apparatus 20 will remain wedged within the carcass 98. Also, the screw members 100 extending from the spreading plates 84 (see FIG. 2B) dig into the carcass 98 to hinder the carcass 98 from sliding around or moving relative to the spreading plates 84. Furthermore, the screw members 100 help to vertically support the carcass 98 by transferring at least part of the carcass weight to the apparatus 20.

With the apparatus 20 operably installed within the carcass 98 and with the spreading plates 84 opened and pressing against the interior of the carcass rib cage 96, the apparatus 20 may be able to support most or all of the weight of the carcass 98. Hence at this point, it may be no longer necessary to support the carcass 98 by the limbs 102 (as shown in FIG. 4). This is advantageous for carving meat from the carcass 98 because with the use of the preferred embodiment, the lower portion 104 of the carcass 98 (including the rear limbs 102) can be separated from the upper portion 106 of the carcass 98, as shown in FIG. 5. Also at this point, because the upper portion 106 of the carcass 98 is supported and held by the apparatus 20 of the preferred embodiment, the front limbs 108 may be removed also, if desired or needed.

Because the preferred embodiment allows a person 110 to easily maneuver the carcass 98 (e.g., up and down with the first actuator 21, or pivoted clockwise or counterclockwise with the second actuator 22) with the press of a pedal on one of the foot-pedal-operated valve switches 31–33, the task of carving meat from the carcass 98 can be made much easier. For example, as shown in FIG. 6, the carcass 98 is tilted to one side to allow the person 110 to carve meat from the right shoulder of the carcass 98 in a comfortable position, and without having to wrestle with the carcass 98 to get it into a good position for carving meat from this region.

An advantage of the preferred embodiment is that it allows a user to adjust the height of the carcass for each individual to reduce or eliminate stooping or bending over, which provides a more ergonomic position and reduces or eliminates back strain. Also, the preferred embodiment provides another advantage of less handling and lifting of the carcass while carving meat from it. The variety of positions for the carcass that are easily attainable with the use of the preferred embodiment will make it easier to obtain more meat from the carcass while expending less energy and effort. Furthermore, the preferred embodiment prevents or eliminates movement of the carcass while carving meat therefrom and stabilizes the carcass to make it easier to work with. Therefore, the preferred embodiment provides a much improved way to handle and secure a carcass 98 with carving meat from it.

Although the preferred embodiment shown in FIGS. 1–6 has three actuators 21–23, in other embodiments the number of actuators used may vary. For example, a second embodiment (not shown) may have only one actuator to reduce the cost of the apparatus 20. In the second embodiment, the apparatus 20 may be limited to a single actuator attached to the second support member 62 for actuating the scissors linkage 86 and spreading plates 84. In such case, the base member 24 may still have provisions for manual adjustments and movement of the first support member 61, such as up and down along the first axis 26, or pivotal movement about the first axis 26. For example, the base member 24 may have a set screw (not shown) to lock the first support member 61 in place relative to the base member 24.

Similarly in the second embodiment (not shown), the second support member 62 may be manually tilted relative to the first support member 61 and locked in place with a set pin (not shown), for example. Also, a linkage, spring, or gear reduction component (not shown) may be incorporated in an embodiment of the present invention to provide a mechanical advantage and assistance in moving part of the apparatus 20. With the benefit of this disclosure, one of ordinary skill in the art will likely realize many other variations to design and build other embodiments of the present invention.

Although the invention has been described with reference to certain exemplary arrangements, it is to be understood that the form of the invention shown and described is to be treated as a preferred embodiment. In light of the description herein, various changes, substitutions, and modifications may be realized without departing from the spirit and scope of the invention as defined by the appended claims.

I claim:

1. An apparatus for holding and maneuvering an animal carcass while holding open a rib cage of the carcass, the apparatus comprising:
    a first support member;
    a second support member pivotally coupled to the first support member so that the second support member can pivot about an axis relative to the first support member;
    a linear actuator attached to and supported by the second support member;
        a pair of spreading plates adapted for insertion into an open rib cage of an animal carcass; and
        a scissors linkage having a first end, a second end and a central portion, the scissors linkage being coupled to the actuator at a first end of the scissors linkage, coupled to the second support member at central portion of the scissors linkage and coupled to the spreading plates at a second end of the scissors linkage, said scissors linkage being operable to retract the spreading plates toward each other to permit insertion of the retracted spreading plates into an open rib cage of an animal carcass and to expand the spreading plates against the rib cage for spreading and holding open the rib cage of an animal carcass in response to operation of the linear actuator.

2. The apparatus of claim 1, further comprising a base member, the first support member being coupled to and supported by the base member.

3. The apparatus of claim 2, wherein the base member comprises a base actuator, so that the base actuator can move the first support member relative to the base member.

4. The apparatus of claim 3, wherein the base actuator comprises a pneumatic cylinder.

5. The apparatus of claim 3, wherein the base actuator comprises a hydraulic cylinder.

6. The apparatus of claim 3, wherein the base actuator comprises an electric motor and a screw gear, the electric motor being adapted to drive the screw gear.

7. The apparatus of claim 3, wherein the base actuator comprises an electric solenoid.

8. The apparatus of claim 1, wherein the linear actuator comprises a pneumatic cylinder.

9. The apparatus of claim 8, wherein the linear actuator comprises a hydraulic cylinder.

10. The apparatus of claim 8, wherein the linear actuator comprises an electric motor and a screw gear, the electric motor being adapted to drive the screw gear.

11. The apparatus of claim 8, wherein the linear actuator comprises an electric solenoid.

12. The apparatus of claim 1, further comprising:
    a pivotal actuator coupled to the first support member and pivotally coupled to the second support member so that the pivotal actuator can pivot the second support member relative to the first support member.

13. The apparatus of claim 12, wherein the pivotal actuator comprises a pneumatic motor.

14. The apparatus of claim 12, wherein the pivotal actuator comprises a hydraulic motor.

15. The apparatus of claim 12, wherein the pivotal actuator comprises an electric motor.

16. An apparatus for spreading open a rib cage of an animal carcass and for holding, supporting, and maneuvering the carcass while holding open the rib cage of the carcass, the apparatus comprising:
    a first actuator;
    a first support member coupled to the first actuator so that the first actuator can move the first support member up and down along a first axis;
    a second support member pivotally coupled to the first support member so that the second support member can pivot about a second axis relative to the first support member;
    a second actuator coupled to the second support member so that the second actuator can pivot the second support member about the second axis;
    a third actuator attached to and supported by the second support member;
    a pair of spreading plates; and
    a scissors linkage coupled to the third actuator at a first end of the scissors linkage, coupled to the second support member at central portion of the scissors linkage and coupled to the spreading plates at a second end of the scissors linkage.

17. The apparatus of claim 16, wherein the first, second, and third actuators each comprise a pneumatic actuator.

18. The apparatus of claim 17, further comprising:
    a first foot pedal valve switch for controlling movement of the first actuator, the first foot pedal valve switch being fluidly coupled to the first actuator by a first pair of hoses;
    a second foot pedal valve switch for controlling movement of the second actuator, the second foot pedal valve switch being fluidly coupled to the second actuator by a second pair of hoses; and
    a third foot pedal valve switch for controlling movement of the third actuator, the third foot pedal valve switch being fluidly coupled to the third actuator by a third pair of hoses.

19. The apparatus of claim 16, wherein the first, second, and third actuators each comprise a pneumatic actuator.

20. The apparatus of claim 16, wherein the first, second, and third actuators each comprise a hydraulic actuator.

21. The apparatus of claim 16, wherein the first, second and third actuators each comprise an electric motor.

22. The apparatus of claim 16, wherein the first and third actuators each comprise an electric solenoid, and the second actuator comprises an electric motor.

23. The apparatus of claim 16, further comprising screw members or metal pins projecting from the spreading plates for penetrating the animal carcass.

24. The apparatus of claim 23, further comprising:
 a first foot pedal actuated two-way valve for controlling movement of the first actuator, the first valve being fluidly coupled to the first actuator by a first pair of hoses and the first valve being fluidly coupled to a source of compressed air with a first air source hose;
 a second foot pedal actuated two-way valve for controlling movement of the second actuator, the second valve being fluidly coupled to the second actuator by a second pair of hoses and the second valve being fluidly coupled to the source of compressed air with a second air source hose; and
 a third foot pedal actuated two-way valve for controlling movement of the third actuator, the third valve being fluidly coupled to the third actuator by a third pair of hoses and the third valve being fluidly coupled to the source of compressed air with a third air source hose.

25. The apparatus of claim 16, wherein the screw members or metal pins having shaft end portions projecting from the spreading plates, and further including plastic jackets or sleeves covering the protruding shaft end portions.

26. An apparatus for spreading open a rib cage of an animal carcass and for holding, supporting, and maneuvering the carcass while holding open the rib cage of the carcass, the apparatus comprising:
 a base member comprising a first pneumatic actuator;
 a first support member attached to an upper and of the first actuator so that the first actuator can move the first support member up and down along a first axis;
 a second support member pivotally coupled to the first support member so that the second support member can pivot about a second axis relative to the first support member;
 a second pneumatic actuator fixed to the first support member and pivotally coupled to the second support member so that the second actuator can pivot the second support member about the second axis relative to the first support member;
 a third pneumatic actuator fixed to and supported by the second support member;
 a pair of spreading plates;
 screw members extending from the spreading plates; and
 a scissors linkage coupled to the third actuator at a first end of the scissors linkage, coupled to the second support member at central portion of the scissors linkage, and coupled to the spreading plates at a second end of the scissors linkage, so that the spreading plates move apart relative to each other when the third actuator is extended.

* * * * *